(12) United States Patent
Rutkowski et al.

(10) Patent No.: US 12,126,249 B2
(45) Date of Patent: Oct. 22, 2024

(54) HYBRID BUCK CONVERTER

(71) Applicant: QUALCOMM Incorporated, San Diego, CA (US)

(72) Inventors: Joseph Dale Rutkowski, Chandler, AZ (US); Yikai Wang, San Diego, CA (US); Navankur Beohar, Chandler, AZ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/653,678

(22) Filed: Mar. 7, 2022

(65) Prior Publication Data

US 2023/0283163 A1   Sep. 7, 2023

(51) Int. Cl.
*H02M 3/158* (2006.01)
*H02M 1/00* (2006.01)

(52) U.S. Cl.
CPC ....... *H02M 1/0095* (2021.05); *H02M 3/1582* (2013.01)

(58) Field of Classification Search
CPC ........ H02M 3/07; H02M 3/073; H02M 3/077; H02M 3/1582; H02M 3/1584; H02M 3/318; H02M 3/156; H02M 3/1552
See application file for complete search history.

(56) References Cited

U.S. PATENT DOCUMENTS

| | | | |
|---|---|---|---|
| 8,786,371 B2 | 7/2014 | Popplewell et al. | |
| 9,118,241 B2 | 8/2015 | Broussev et al. | |
| 10,298,124 B2 | 5/2019 | Petersen et al. | |
| 10,393,818 B2* | 8/2019 | Din | H02J 7/0014 |
| 2013/0234513 A1 | 9/2013 | Bayer | |
| 2014/0334199 A1 | 11/2014 | He et al. | |
| 2019/0028029 A1 | 1/2019 | Bieber et al. | |
| 2021/0083575 A1 | 3/2021 | Jin et al. | |
| 2021/0351719 A1 | 11/2021 | Chuang et al. | |

(Continued)

FOREIGN PATENT DOCUMENTS

WO    2021155507 A1    8/2021

OTHER PUBLICATIONS

U.S. Appl. No. 17/462,243, filed Aug. 31, 2021.

(Continued)

*Primary Examiner* — Nguyen Tran
(74) *Attorney, Agent, or Firm* — Patterson & Sheridan LLP

(57) ABSTRACT

Certain aspects of the present disclosure generally relate to electronic circuits and, more particularly, to a power supply circuit and techniques for voltage regulation. One example method for voltage regulation is performed by a switched-mode power supply (SMPS). The method generally includes charging a first capacitive element during a first discharge phase of the SMPS having a first voltage rail and a second voltage rail, the first voltage rail being separate from the second voltage rail. Charging the first capacitive element may include directing a first current to flow from the second voltage rail to a reference potential node through the first capacitive element. In some aspects, the method also includes generating an output voltage at the output node during a first charge phase by directing a second current to flow from the first voltage rail to an inductive element of the SMPS through the first capacitive element.

12 Claims, 7 Drawing Sheets

(56) References Cited

U.S. PATENT DOCUMENTS

2022/0231601 A1\* 7/2022 Jong .................. H02M 1/0043
2023/0066436 A1\* 3/2023 Rutkowski .......... H02M 1/0009

OTHER PUBLICATIONS

U.S. Appl. No. 17/448,475, filed Sep. 22, 2021.
International Search Report and Written Opinion—PCT/US2023/062284—ISA/EPO—May 8, 2023.

\* cited by examiner

700 ⟶

702 — Charge a first capacitive element during a first discharge phase of the SMPS having a first voltage rail and a second voltage rail, the first voltage rail being separate from the second voltage rail, wherein a voltage at the first voltage rail is less than a voltage at the second voltage rail, wherein charging the first capacitive element comprises directing a first current to flow from the second voltage rail to a reference potential node through the first capacitive element

704 — Generate an output voltage at an output node during a first charge phase by directing a second current to flow from the first voltage rail to an inductive element of the SMPS through the first capacitive element

FIG. 7

HYBRID BUCK CONVERTER

TECHNICAL FIELD

Certain aspects of the present disclosure generally relate to electronic circuits and, more particularly, to a power supply circuit and regulation.

BACKGROUND

A voltage regulator ideally provides a constant direct current (DC) output voltage regardless of changes in load current or input voltage. Voltage regulators may be classified as either linear regulators or switching regulators. While linear regulators tend to be small and compact, many applications may benefit from the increased efficiency of a switching regulator. A linear regulator may be implemented by a low-dropout (LDO) regulator, for example. A switching regulator may be implemented by a switched-mode power supply (SMPS), such as a buck converter, a boost converter, or a buck-boost converter.

Power management integrated circuits (power management ICs or PMICs) are used for managing the power requirement of a host system and may include and/or control one or more voltage regulators (e.g., boost converters). A PMIC may be used in battery-operated devices, such as mobile phones, tablets, laptops, wearables, etc., to control the flow and direction of electrical power in the devices. The PMIC may perform a variety of functions for the device such as DC-to-DC conversion (e.g., using a voltage regulator as described above), battery charging, power-source selection, voltage scaling, power sequencing, etc. For example, a PMIC may feature a buck converter to perform voltage regulation based on a DC input voltage.

SUMMARY

Certain aspects of the present disclosure relate to a switched-mode power supply (SMPS). The SMPS generally includes: an inductive element coupled to an output of the SMPS; a first switch; a second switch, wherein the first switch is coupled between a first voltage rail and the second switch, and wherein the second switch is coupled between the first switch and the inductive element; a third switch coupled between the inductive element and a reference potential node; a fourth switch; a fifth switch, wherein the fourth switch is coupled between a second voltage rail and the fifth switch, and wherein the fifth switch is coupled between the fourth switch and the second switch; and a sixth switch coupled between the fifth switch and the reference potential node.

Certain aspects of the present disclosure relate to an apparatus. The apparatus generally includes an SMPS as described herein, a first battery coupled between the first voltage rail and the reference potential node, and a second battery coupled between the second voltage rail and the first battery.

Certain aspects of the present disclosure relate to a method for voltage regulation by a SMPS. The method generally includes: charging a first capacitive element during a first discharge phase of the SMPS, the SMPS having a first voltage rail and a second voltage rail, wherein the first voltage rail is separate from the second voltage rail, wherein a voltage at the first voltage rail is less than a voltage at the second voltage rail, and wherein charging the first capacitive element comprises directing a first current to flow from the second voltage rail to a reference potential node through the first capacitive element; and generating an output voltage at an output node during a first charge phase by directing a second current to flow from the first voltage rail to an inductive element of the SMPS through the first capacitive element.

Certain aspects of the present disclosure relate to an apparatus for voltage regulation. The apparatus generally includes: an inductive element; a capacitive element; a first voltage rail; a second voltage rail separate from the first voltage rail, wherein a voltage at the first voltage rail is configured to be less than a voltage at the second voltage rail; means for charging the capacitive element during a discharge phase of the apparatus, wherein charging the capacitive element comprises directing a first current to flow from the second voltage rail to a reference potential node through the capacitive element; and means for generating an output voltage at an output node during a charge phase by directing a second current to flow from the first voltage rail to the inductive element through the capacitive element.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 7 is a flow diagram illustrating example operations for voltage regulation, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Certain aspects of the present disclosure are directed to apparatus and techniques for voltage regulation. For example, certain aspects provide a hybrid buck converter that may be configured for a single or stacked battery cell configuration. In some aspects, based on the input-to-output conversion ratio associated with the buck converter, the circuit and operation of the buck converter may be reconfigured, as described in more detail herein.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

An Example Device

Figure 1:
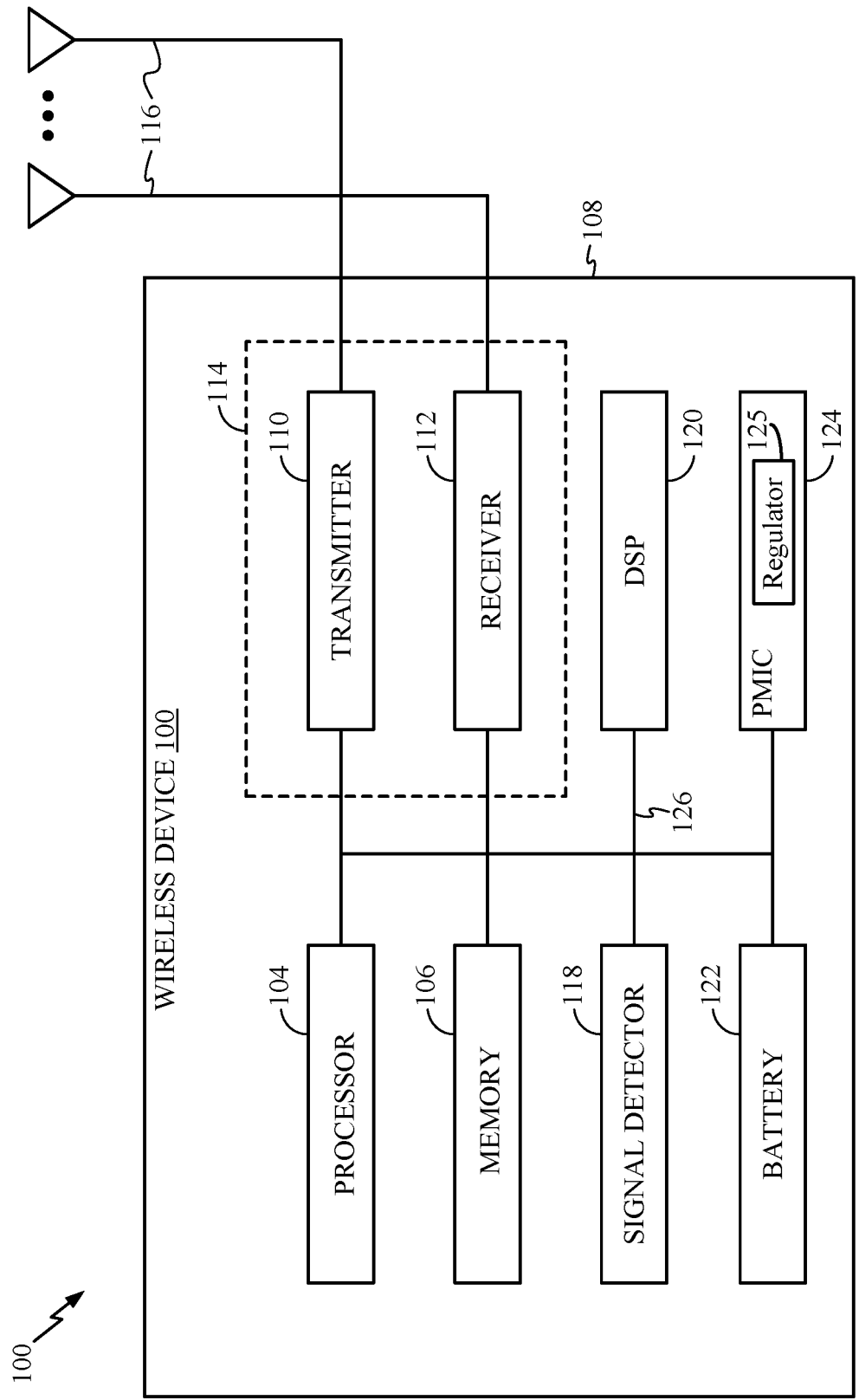
FIG. 1 is a block diagram of an example device including a voltage regulator, in which aspects of the present disclosure may be practiced.

FIG. 1 illustrates a device 100. The device 100 may be a battery-operated and/or wireless device such as a cellular phone, a personal digital assistant (PDA), a handheld device, a wireless modem, a laptop computer, a tablet, a personal computer, a head-mounted or other wearable device, an augmented or virtual reality device, etc. The device 100 is an example of a device that may be configured to implement the various systems and methods described herein.

The device 100 may include at least one processor 104 which controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 typically performs logical and arithmetic operations based on program instructions stored within the memory 106. The instructions in the memory 106 may be executable to implement the methods described herein.

The device 100 may also include a housing 108 that may include a transmitter 110 and a receiver 112 to allow transmission and reception of data between the device 100 and a remote location. The transmitter 110 and receiver 112 may be combined into a transceiver 114. A plurality of antennas 116 may be electrically coupled to the transceiver 114. One or more of the antennas 116 may be disposed adjacent to, attached to, or integrated in the housing 108. The device 100 may also include (not shown) multiple transmitters, multiple receivers, and multiple transceivers.

The device 100 may also include a signal detector 118 that may be used in an effort to detect and quantify the level of signals received by the transceiver 114. The signal detector 118 may detect such signals as total energy, energy per subcarrier per symbol, power spectral density and other signals. The device 100 may also include a digital signal processor (DSP) 120 for use in processing signals.

The device 100 may further include a battery 122 used to power the various components of the device 100. The device 100 may also include a power management integrated circuit (power management IC or PMIC) 124 for managing the power provided from the battery to the various components of the device 100. The PMIC 124 may perform a variety of functions for the device such as DC-to-DC conversion (e.g., with a voltage regulator 125), battery charging, power-source selection, voltage scaling, power sequencing, etc. In certain aspects, the PMIC 124 may include a buck converter, as described in more detail herein.

The various components of the device 100 may be coupled together by a bus system 126, which may include a power bus, a control signal bus, and a status signal bus in addition to a data bus.

Example Voltage Regulation System

A stacked battery cell configuration has been introduced to decrease battery charging times and reduce charging losses. A stacked battery cell configuration includes two (referred to as a 2S battery configuration) or more battery cells in series, whereas a single battery cell configuration (referred to as a 1S battery configuration) includes a single battery cell. In many power management unit (PMU) designs, boost or buck-boost converters are the system's performance bottleneck due to the loop bandwidths of the converters. As a result, it is challenging to meet all system specifications such as high speed, large load current, and small bill of materials (BOM).

In a cellular phone platform, for a stacked battery cell configuration, an electronic device may have separate voltage rails (V1 and V2). Each voltage rail can have a wide operation range, e.g., ranging from 2 V to 5.5 V for V1 and 4 V to 11 V for V2. Therefore, a switched-mode power supply (SMPS) configured in a boost mode of operation to convert a low voltage to a high voltage may be used in some corner operation range with some buck-boost or three-level buck-boost architectures. Therefore, the loop bandwidth of the SMPS has to accommodate boost operation, even though the SMPS may be operated in boost mode for only a small portion (e.g., a fifth or half) of the time the SMPS is operated.

Certain aspects use a voltage rail input and a charge pump configuration to eliminate boost or buck-boost operation in an SMPS, allowing operation in only a buck mode to increase bandwidth. For example, certain aspects use the single or stacked battery cell configuration to implement a 4-level hybrid buck operation. Based on an input-to-output conversion ratio (e.g., the ratio of battery voltage to output voltage (Vout)), the SMPS provided herein performs buck operations between a 3S voltage (e.g., three times the 1S voltage) and a 2S voltage (e.g., twice the 1S voltage for a single cell configuration or the 2S voltage for a stacked cell configuration), between 2S and 1S, or between 1S and ground.

Figure 2A:
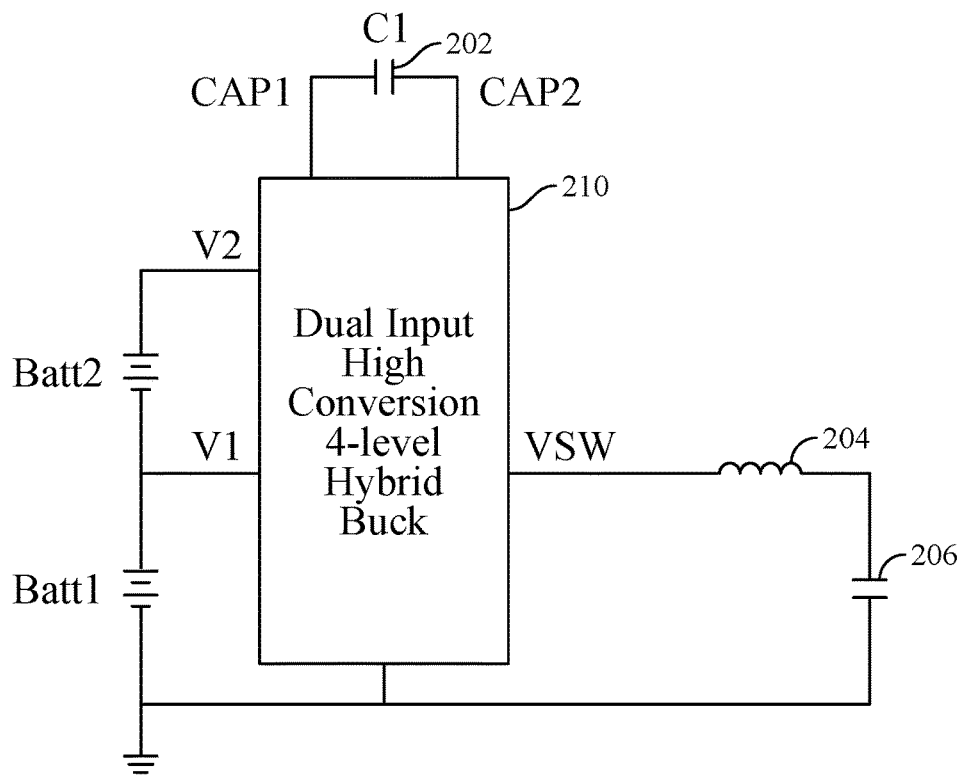
FIGS. 2A and 2B illustrate stacked battery cell and single battery cell configurations, respectively, used to generate voltage rails for a hybrid buck converter, according to certain aspects of the present disclosure.
Figure 2B:
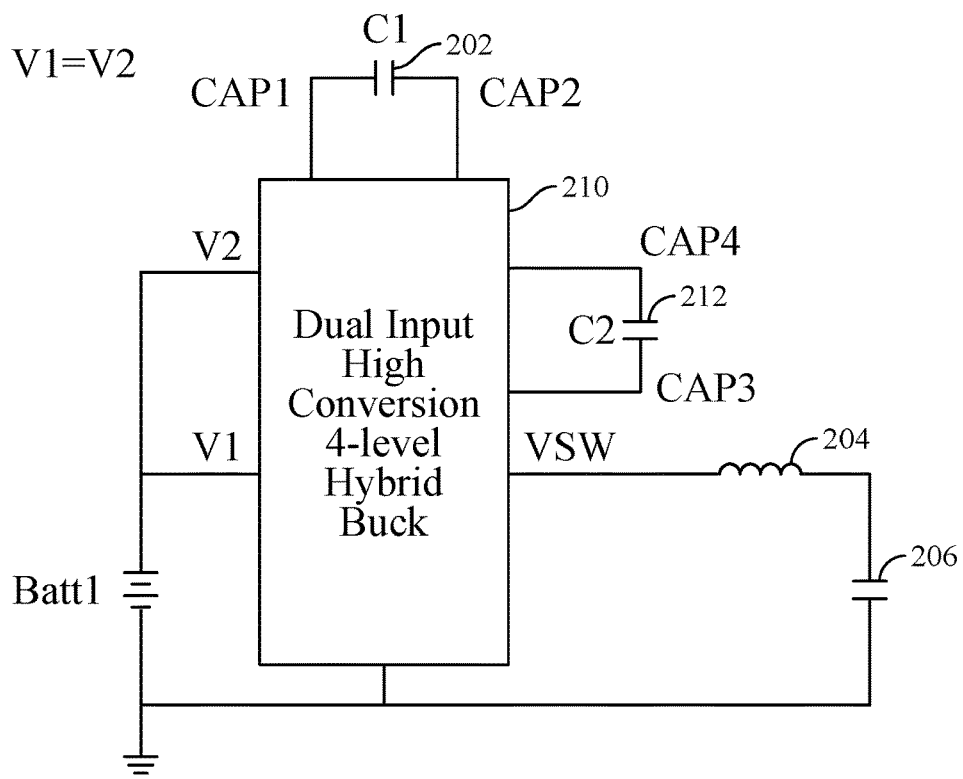

FIGS. 2A and 2B illustrate 2S and 1S battery configurations, respectively, used to generate voltage rails V1 and V2 for a hybrid buck converter. As shown in FIG. 2A, for a 2S battery configuration, a first battery (Batt1) may be used to generate the voltage at rail V1 and a second battery (Batt2) may be used to generate the voltage at rail V2, where the voltage at rail V1 is equal to the battery voltage (Vbatt1) associated with Batt1 and the voltage at rail V2 is equal to Vbatt1 plus the battery voltage (Vbatt2) associated with Batt2. As shown in FIG. 2B, for a 1S battery configuration, Batt1 may be used to provide both V1 and V2 such that V1 is equal to V2, as shown. In other words, voltage rail V1 may be shorted to voltage rail V2, for the 1S battery configuration.

In the 2S battery configuration shown in FIG. 2A, a capacitive element 202 (labeled "C1"), an inductive element 204, and a load capacitive element 206 may be implemented for the buck converter. As shown, the capacitive element 202, the inductive element 204, and the load capacitive element 206 may be external to an IC 210 (labeled "Dual Input High Conversion 4-level Hybrid Buck") used to implement various switches and other components for the buck operations described herein. The capacitive element 202 is coupled between node CAP1 and node CAP2. As shown in FIG. 2B, for the 1S battery configuration, a capacitive element 212 (labeled "C2") is implemented external to the IC 210 and between node CAP3 and node CAP4. The hybrid buck converters shown in FIGS. 2A and 2B may include the capacitive element 202, the inductive element 204, the load capacitive element 206, and the IC 210, while the 1S battery configuration of FIG. 2B may additionally include the capacitive element 212.

Figure 3A:
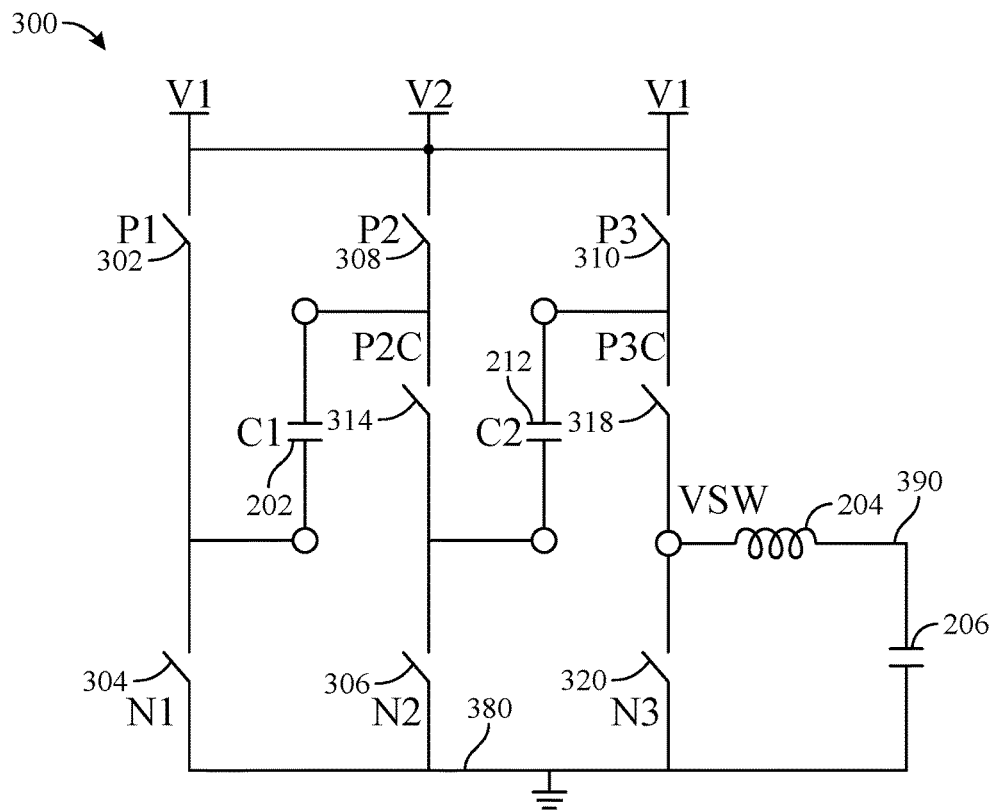
FIG. 3A shows an example buck converter with a single battery cell configuration, according to certain aspects of the present disclosure.
Figure 3B:
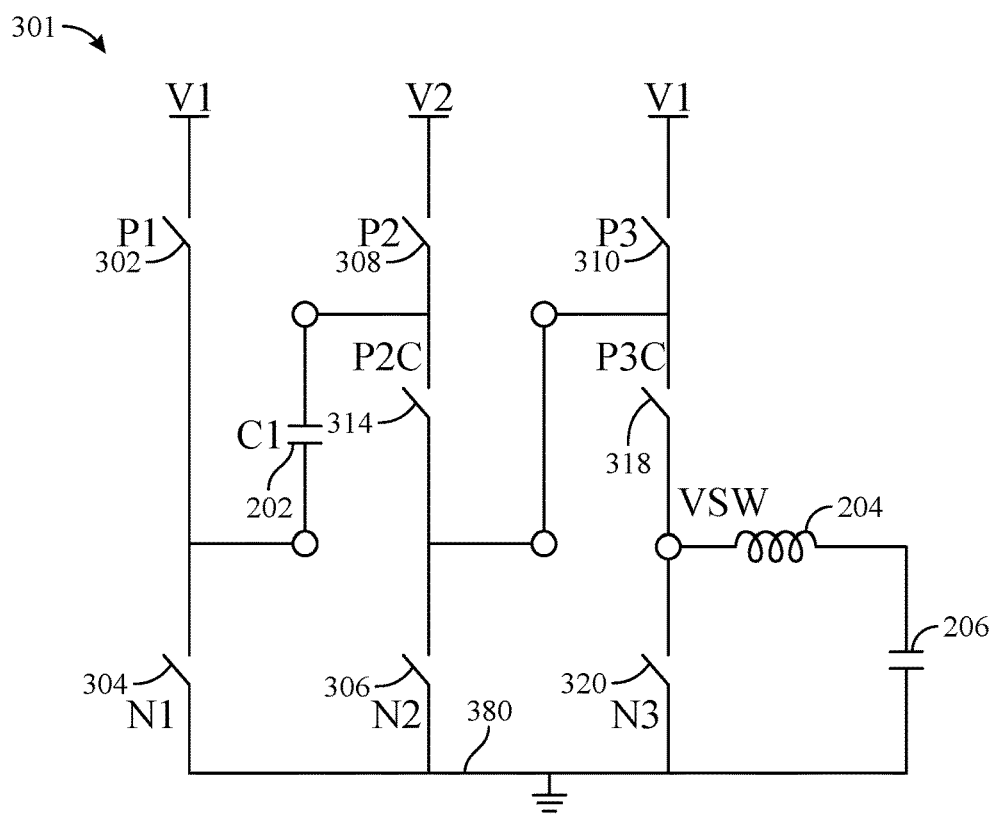
FIG. 3B shows an example buck converter with a stacked battery cell configuration, according to certain aspects of the present disclosure.

FIG. 3A shows an example hybrid buck converter 300 with a 1S battery configuration (e.g., a single battery cell configuration), and FIG. 3B shows an example hybrid buck converter 301 with a 2S battery configuration (e.g., a stacked battery cell configuration). The hybrid buck converter 300 may be an example implementation of the hybrid buck converter in FIG. 2B for a 1S battery configuration. The hybrid buck converter 301 may be an example implementation of the hybrid buck converter in FIG. 2A for a 2S battery configuration.

As shown in FIG. 3A for the 1S battery configuration, the voltage rails V1 and V2 are shorted together (e.g., effectively forming a single voltage rail). As shown in FIG. 3B for the 2S battery configuration, the voltage rails V1, V2 are separate rails. Switch 310 (labeled "P3") and switch 318 (labeled "P3C") are coupled in a series path between rail V1 and a switching node (VSW), where inductive element 204 and load capacitive element 206 are coupled in a series path between VSW and a reference potential node 380 (e.g., electrical ground node). The inductive element 204 is coupled between VSW and an output node 390 of the buck converter. As shown, switch 320 (labeled "N3") is coupled between VSW and the reference potential node. For certain aspects, switch 318 may be removed and replaced with a short, for example.

Moreover, switch 308 (labeled "P2"), switch 314 (labeled "P2C"), and switch 306 (labeled "N2") are coupled in a series path between voltage rail V2 (e.g., which is the same as rail V1 for the 1S battery configuration) and the reference potential node 380, and switch 302 (labeled "P1") and switch 304 (labeled "N1") are coupled in another series path between voltage rail V1 and the reference potential node. As shown in FIG. 3A for the 1S battery configuration, capacitive element 212 (labeled "C2") has a first terminal coupled to a node between switches 310, 318 and has a second terminal coupled to a node between switches 306, 314, and capacitive element 202 (labeled "C1") has a first terminal coupled to a node between switches 308, 314 and has a second terminal coupled to a node between switches 302, 304, as shown. As shown in FIG. 3B for the 2S battery configuration, the node between switches 310, 318 is shorted to the node between switches 306, 314 (e.g., as opposed to being coupled through capacitive element 212, as in FIG. 3A). The switches described herein may be implemented by transistors, such as p-type metal-oxide-semiconductor (PMOS) or n-type metal-oxide-semiconductor (NMOS) transistors.

In certain aspects for the 2S battery configuration, switch 314 may be removed and replaced with a short, for example. Additionally or alternatively in certain aspects for the 2S battery configuration, switch 306 may be removed and replaced with a short, for example.

Figure 4A:
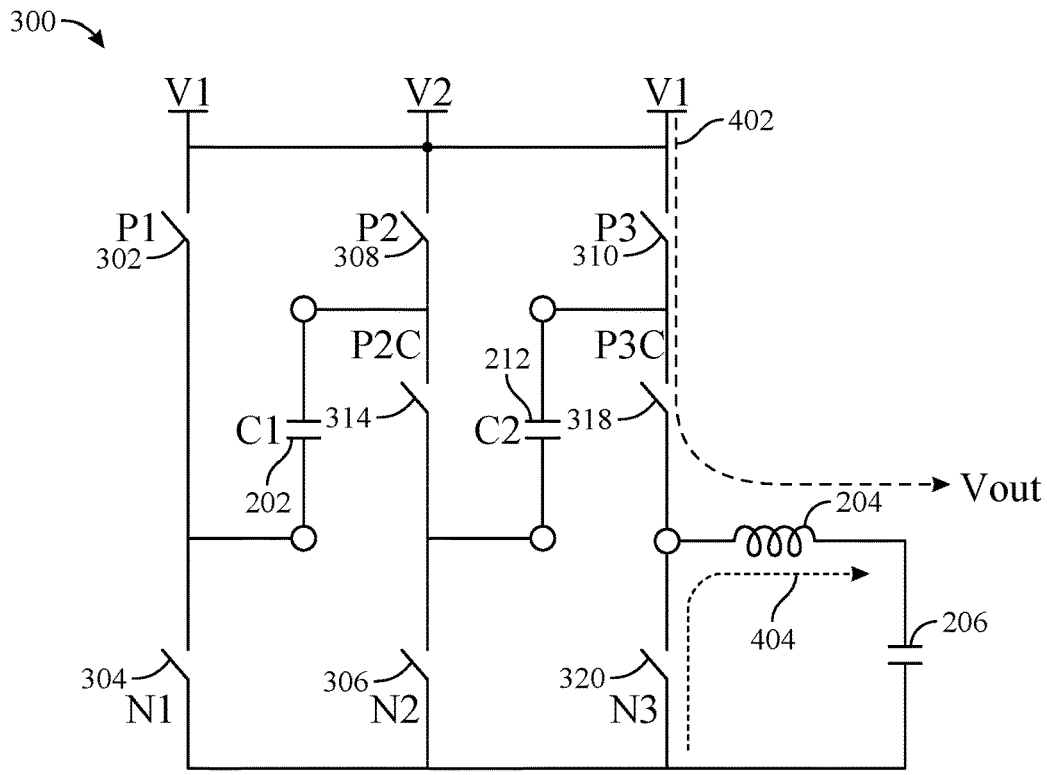
FIGS. 4A, 4B, 5A, 5B, 6A, and 6B illustrate current flows during charge and discharge phases of a buck converter, according to certain aspects of the present disclosure.
Figure 4B:
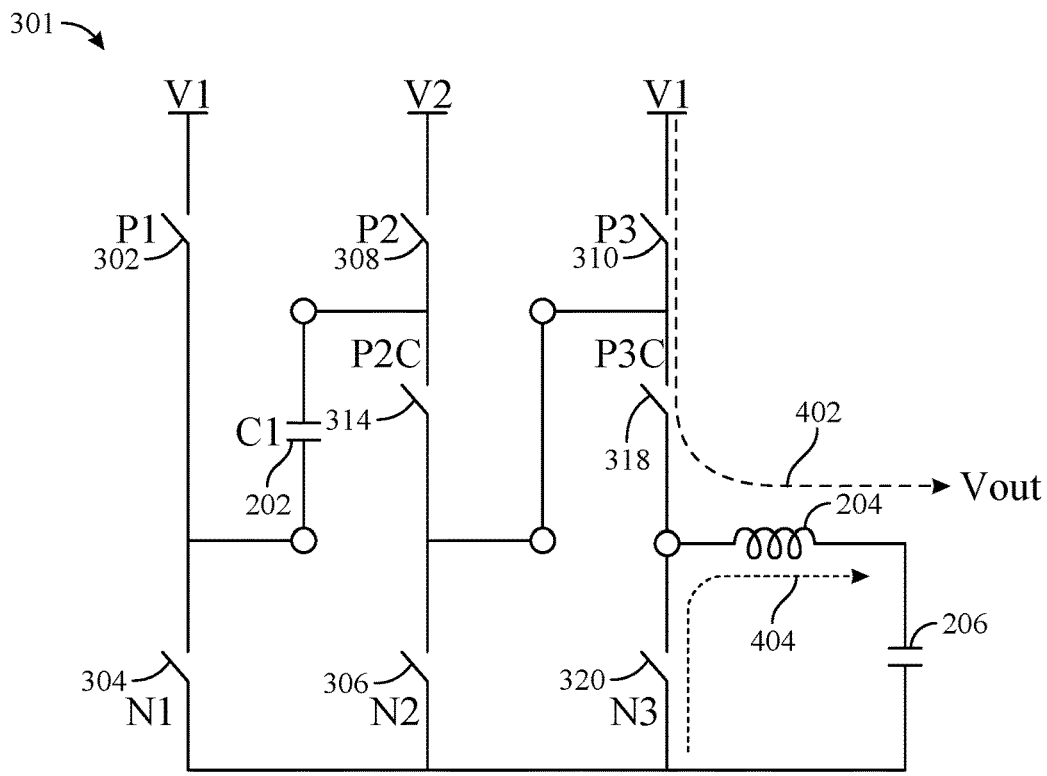

FIG. 4A illustrates current flows during charge and discharge phases when Vout is less than a 1S voltage (e.g., the voltage at rail V1) for the single battery cell configuration. FIG. 4B illustrates current flows during charge and discharge phases when Vout is less than a 1S voltage (e.g., the voltage at rail V1) for the stacked battery cell configuration. The reference potential node 380 and the output node 390 are omitted for simplicity from FIGS. 4A and 4B (as well as from FIGS. 5A-6B), but remain at their respective positions as indicated in FIGS. 3A and 3B. The output voltage Vout corresponds to the voltage at output node 390 (with respect to the reference potential node 380).

Curve 402 shows the current flow during the charge phase, and curve 404 shows the current flow during the discharge phase. When Vout is less than the 1S voltage, switches 310, 318 are closed (not shown) while switch 320 is open during the charge phase, and switch 320 is closed (not shown) while switches 310, 318 are open during the discharge phase, for both the single battery cell configuration shown in FIG. 4A and the stacked battery cell configuration shown in FIG. 4B. During the charge phase, current flows from voltage rail V1 to the inductive element 204, charging the energy stored in inductive element 204. During the discharge phase, current flows from the reference potential node to the inductive element 204, discharging the energy stored in the inductive element 204.

For certain aspects in cases where Vout is less than the 1S voltage, the switches 302, 304, 306, 308, and 314 may be open during the charge and discharge phases.

Figure 5A:
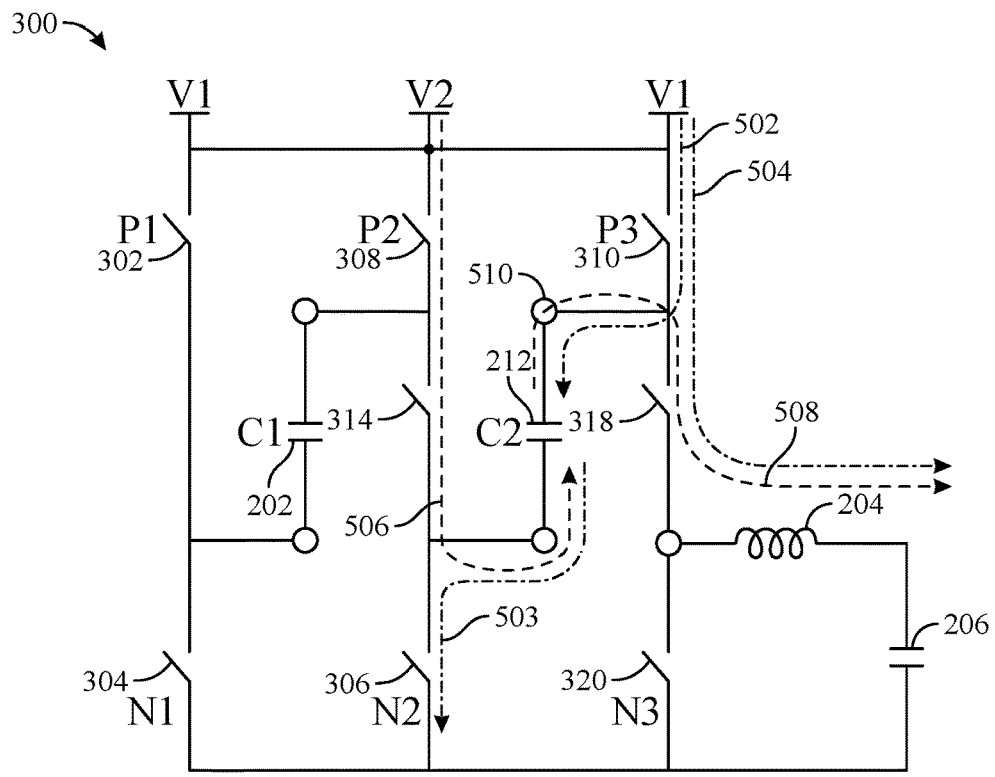
Figure 5B:
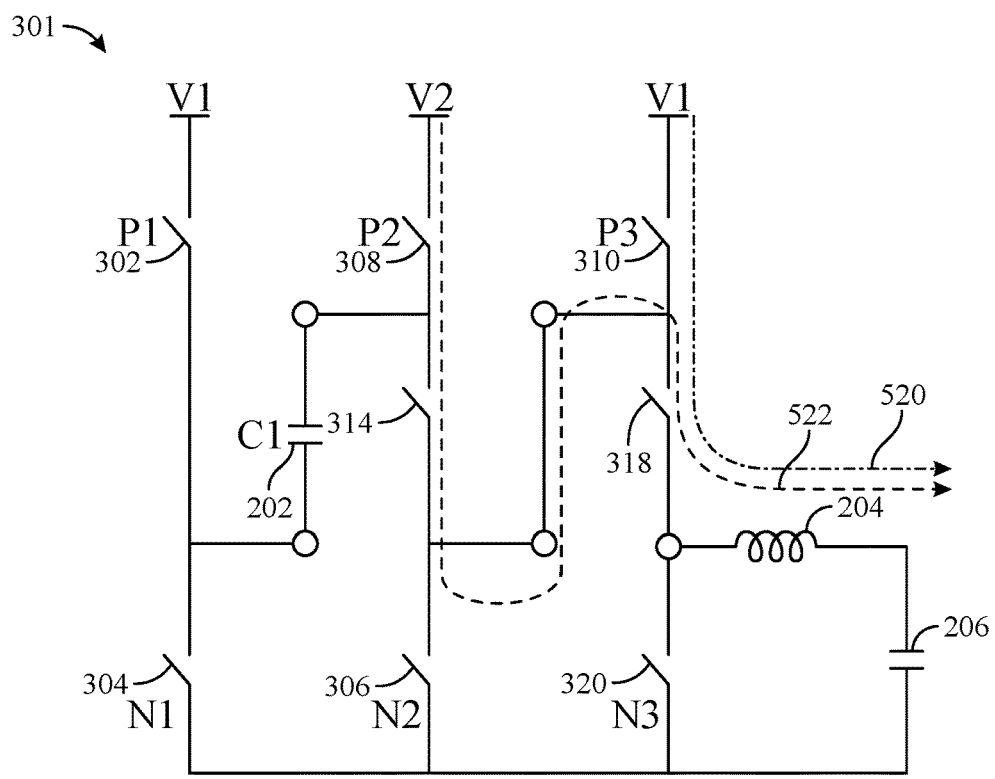

FIG. 5A illustrates current flow during charge and discharge phases when Vout is greater than the 1S voltage (e.g., the voltage at rail V1) and less than the 2S voltage for the 1S battery cell configuration. FIG. 5B illustrates current flow during charge and discharge phases when Vout is greater than the 1S voltage (e.g., the voltage at rail V1) and less than the 2S voltage for the stacked battery cell configuration. For the 1S battery cell configuration, the 2S voltage may be equal to twice the 1S voltage, and for the 2S battery cell configuration, the 2S voltage may be equal to the voltage of rail V2.

For the 1S battery cell configuration of FIG. 5A, when Vout is greater than the 1S voltage and less than the 2S voltage, switches 310, 318, and 306 are closed (not shown) while switches 308, 314, and 320 are open during the discharge phase, and switches 308, 314, and 318 are closed (not shown) while switches 306, 310, and 320 are open during the charge phase. Curves 502, 503, 504 show the current flow in the hybrid buck converter during the discharge phase, and curves 506, 508 show the current flow in the hybrid buck converter during the charge phase.

As shown by curves 502, 503, 504 in FIG. 5A for the 1S battery cell configuration, during the discharge phase, current flows to the output of the hybrid buck converter and flows across capacitive element 212, charging capacitive element 212 to the 1S voltage. During the charge phase as shown by curves 506, 508, current flows from voltage rail V2 (e.g., equal to voltage rail V1 for the 1S battery cell configuration) across capacitive element 212 in the opposite direction and to the output through the inductive element 204. Thus, the voltage at node 510 between capacitive element 212 and the inductive element 204 during the charge phase has the sum of the 1S voltage and the voltage (e.g., also equal to the 1S voltage) across capacitive element 212 (as voltage rail V2 and capacitive element 212 are in series during the charge phase), which is equal to the 2S voltage (or twice the 1S voltage), allowing regulation in buck mode of Vout to any voltage between the 1S voltage and the 2S voltage.

For the 2S battery cell configuration shown in FIG. 5B, during the discharge phase, switches 310 and 318 are closed (not shown) while switches 306, 308, 314, and 320 are open, and during the charge phase, switches 308, 314, and 318 are closed (not shown) while switches 306, 310, and 320 are open. Curve 520 shows the current flow in the hybrid buck converter during the discharge phase, and curve 522 shows the current flow in the hybrid buck converter during the charge phase. As shown, during the discharge phase, current flows from voltage rail V1 to the inductive element 204 by closing switches 310, 318, resulting in the discharge of energy in inductive element 204 since the voltage at rail V1 is less than Vout. During the charge phase, current flows from voltage rail V2 to inductive element 204 by closing switches 308, 314, 318, charging the energy stored in inductive element 204 since the voltage at voltage rail V2 is greater than Vout.

For certain aspects in cases where Vout is greater than the 1S voltage and less than the 2S voltage, the switches 302 and 304 may be open during the charge and discharge phases.

Figure 6A:
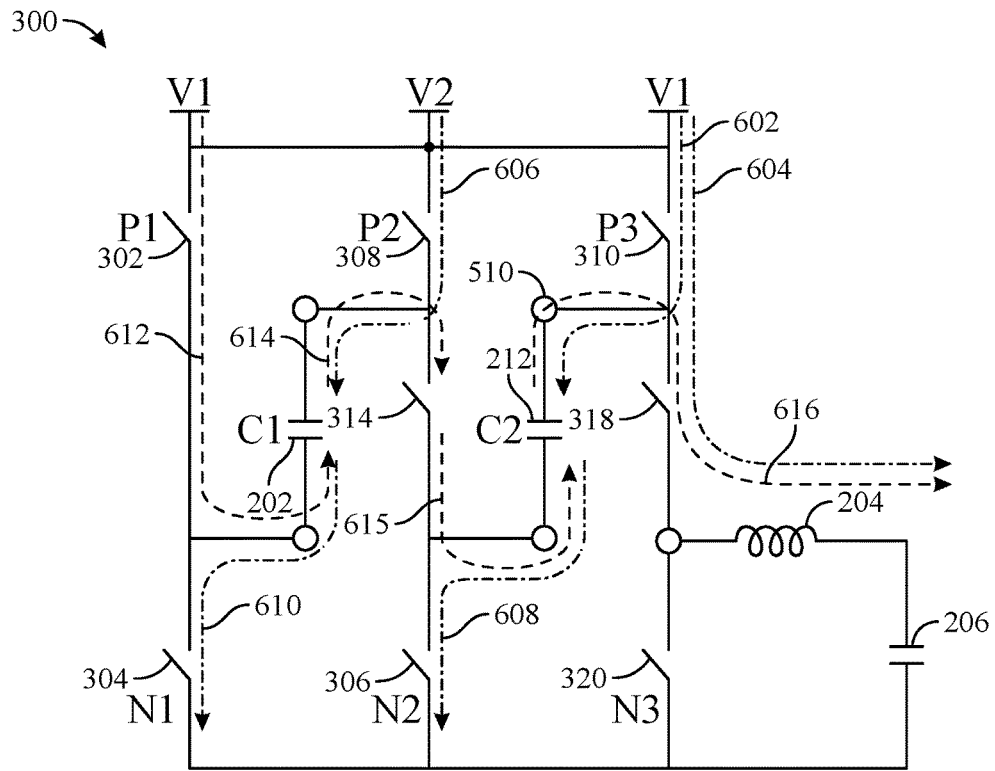
Figure 6B:
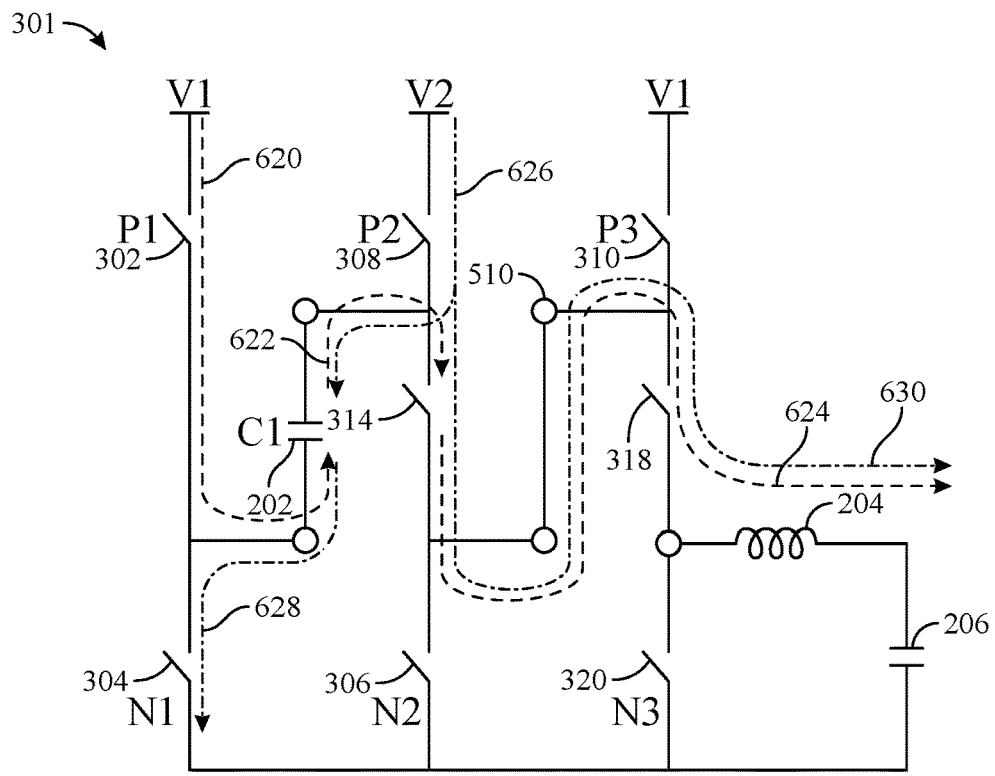

FIG. 6A illustrates current flows during charge and discharge phases when Vout is greater than the 2S voltage for the 1S battery cell configuration. FIG. 6B illustrates current flows during charge and discharge phases when Vout is greater than the 2S voltage for the stacked battery cell configuration.

For the 1S battery cell configuration, when Vout is greater than the 2S voltage, switches 310, 318, 306, 308, and 304 are closed (not shown) while switches 302, 314, and 320 are open during the discharge phase, and switches 302, 314, and 318 are closed (not shown) while switches 304, 306, 308, 310, and 320 are open during the charge phase. Curves 602, 604, 606, 608, 610 show the current flow in the hybrid buck converter during the discharge phase, and curves 612, 614, 615, 616 show the current flow in the hybrid buck converter during the charge phase.

As shown in FIG. 6A for the 1S battery cell configuration, during the discharge phase, current flows to the output of the hybrid buck converter and flows to capacitive element 212, charging capacitive element 212 to the 1S voltage, and also flows to capacitive element 202, charging capacitive element 202 to the 1S voltage. During the charge phase, current flows from the voltage rail V1 across capacitive elements 202, 212 and to the output through the inductive element 204. Thus, the voltage at node 510 between capacitive element 212 and the inductive element 204 during the charge phase is the sum of the 1S voltage at voltage rail V1, the 1S voltage across capacitive element 202, and the 1S voltage across capacitive element 212, which is equal to 3S (e.g., three times the 1S voltage), allowing regulation in buck mode of Vout to any voltage between the 1S voltage and the 3S voltage. The current flows in FIG. 6A may also represent high load current cases where this 3S capability is selected, even though Vout may be less than two times the 1S voltage.

For the 2S battery cell configuration shown in FIG. 6B, during the discharge phase, switches 308, 314, 318, and 304 are closed (not shown) while switches 302, 306, 310, and 320 are open, and during the charge phase, switches 302, 314, and 318 are closed (not shown) while switches 304, 306, 308, 310, and 320 are open. Curves 626, 628, 630 show the current flows in the hybrid buck converter during the discharge phase, and curves 620, 622, 624 show the current flows in the hybrid buck converter during the charge phase.

During the discharge phase, current flows from voltage rail V2 (e.g., having the 2S voltage) through the capacitive element 202 to the reference potential node (e.g., electrical ground node). Thus, the capacitive element 202 is charged to the 2S voltage due to the current flow from voltage rail V2. Current also flows from the voltage rail V2 to the output through switches 308, 314, 318, and inductive element 204 during the discharge phase. During the charge phase, the voltage at node 510 between capacitive element 202 and the inductive element 204 is the sum of the 1S voltage of the voltage rail V1 and the 2S voltage across capacitive element 202, which is equal to the 3S voltage (e.g., the 2S voltage plus the 1S voltage), allowing regulation in buck mode of Vout to any voltage between the 2S voltage and the 3S voltage. Furthermore and similar to the 1S case of FIG. 6A, the mode of operation in FIG. 6B may be selected when Vout is less than the 2S voltage (e.g., for high load current cases).

The aspects described herein facilitate operation of a voltage regulator in buck mode regardless of whether Vout is below the 1S voltage, between the 1S voltage and 2S voltage, or greater than the 2S voltage. Operation in buck mode allows an increase in the bandwidth associated with the SMPS as compared to conventional SMPS implementations that may at least partly operate in a boost or buck-boost mode.

Example Apparatus for Voltage Regulation

Certain aspects of the present disclosure are directed to a switched-mode power supply (SMPS) (e.g., the hybrid buck converter 300 or 301). The SMPS include: an inductive element (e.g., inductive element 204) coupled to an output of the SMPS; a first switch (e.g., switch 310); a second switch (e.g., switch 318), wherein the first switch is coupled between a first voltage rail and the second switch, and wherein the second switch is coupled between the first switch and the inductive element; a third switch (e.g., switch 320) coupled between the inductive element and a reference potential node; a fourth switch (e.g., switch 308); a fifth switch (e.g., switch 314), wherein the fourth switch is coupled between a second voltage rail and the fifth switch, and wherein the fifth switch is coupled between the fourth switch and the second switch; and a sixth switch (e.g., switch 306) coupled between the fifth switch and the reference potential node. In some aspects, the first voltage rail is shorted to the second voltage rail.

In some aspects, the SMPS also includes a capacitive element (e.g., capacitive element 212). The fifth switch may be coupled between the fourth switch and the second switch through the capacitive element.

In some aspects, the SMPS includes a seventh switch (e.g., switch 302) and an eighth switch (e.g., switch 304). The seventh switch may be coupled between the first voltage rail and the eighth switch, and the eighth switch may be coupled between the seventh switch and the reference potential node. The SMPS may also include a first capacitive element (e.g., capacitive element 202) coupled between the seventh switch and the fifth switch. In some aspects, when a voltage at the output of the SMPS is greater than a first voltage at the first voltage rail and, in some cases, greater than a second voltage (e.g., as described with respect to FIGS. 6A and 6B), a first current (e.g., shown by curve 606 in FIG. 6A or curve 626 in FIG. 6B) is configured to flow from the second voltage rail to the reference potential node through the fourth switch, the first capacitive element, and the eighth switch during a discharge phase. Moreover, a second current (e.g., shown by curves 612, 614, 616 in FIG. 6A, or curves 620, 622, 624 in FIG. 6B) is configured to flow from the first voltage rail to the inductive element through the seventh switch, the first capacitive element, the fifth switch, and the second switch during a charge phase. In some aspects, the second voltage is a voltage at the second voltage rail (e.g., for the 2S battery cell configuration). In some aspects, when the voltage at the output of the SMPS is greater than the first voltage and greater than the second voltage at the second voltage rail, a third current (e.g., shown by curve 630 in FIG. 6B) is configured to flow from the second voltage rail to the inductive element through the fourth switch, the fifth switch, and the second switch during the discharge phase. In some aspects, the SMPS also includes a second capacitive element (e.g., capacitive element 212), the fifth switch being coupled between the fourth switch and the second switch through the second capacitive element. When the voltage at the output of the SMPS is greater than the first voltage at the first voltage rail and greater than twice the first voltage (e.g., for the 1S battery cell configuration), a third current (e.g., shown by curves 602, 608) is configured to flow from the first voltage rail to the reference potential node through the first switch, the second capacitive element, and the sixth switch during the discharge phase, and the second current is further configured to flow to the inductive element through the second capacitive element.

Any of the first through eighth switches may be implemented by one or more transistors. These transistors may be either p-type transistors, n-type transistors, or a combination of p-type and n-type transistors.

In some aspects, when a voltage at the output of the SMPS is less than a voltage at the first voltage rail (e.g., as shown in FIGS. 4A and 4B), a first current (e.g., shown by 402) is configured to flow from the first voltage rail to the inductive element through the first switch and the second switch during a charge phase. Moreover, a second current (e.g., shown by curve 404) is configured to flow from the reference potential node to the inductive element through the third switch during a discharge phase.

In some aspects, when a voltage at the output of the SMPS is greater than a first voltage (e.g., at the first voltage rail) and less than a second voltage (e.g., as described with respect to FIGS. 5A and 5B), a first current (e.g., shown by curve 504 of FIG. 5A or curve 520 of FIG. 5B) is configured to flow from the first voltage rail to the inductive element through the first switch and the second switch during a discharge phase, and a second current (e.g., shown by curves 506, 508 of FIG. 5A or curve 522 of FIG. 5B) is configured to flow from the second voltage rail to the inductive element through the fourth switch, the fifth switch, and the second switch during a charge phase. In some aspects, the second voltage is a voltage at the second voltage rail.

In some aspects, the SMPS also includes a capacitive element (e.g., capacitive element 212), the fifth switch being coupled between the fourth switch and the second switch through the capacitive element. When the voltage at the output of the SMPS is greater than the first voltage (e.g., at the first voltage rail) and less than twice the first voltage, a third current (e.g., shown by curves 502, 503) is configured to flow from the first voltage rail to the reference potential node through the first switch, the capacitive element, and the sixth switch during the discharge phase. In this case, the second current (e.g., shown by curves 506, 508) is configured to flow from the second voltage rail to the inductive element through the capacitive element during the charge phase.

Example Operations for Voltage Regulation

FIG. 7 is a flow diagram illustrating example operations 700 for voltage regulation, in accordance with certain aspects of the present disclosure. The operations 700 may be performed, for example, by a switched-mode power supply (SMPS), such as the hybrid buck converter 300 or hybrid buck converter 301.

The operations 700 begin, at block 702, with the SMPS charging a first capacitive element (e.g., capacitive element 202) during a first discharge phase of the SMPS, the SMPS having a first voltage rail and a second voltage rail, where the first voltage rail is separate from (e.g., is not shorted to) the second voltage rail. A voltage at the first voltage rail may be less than a voltage at the second voltage rail, wherein charging the first capacitive element comprises directing a first current (e.g., shown by curves 626, 628) to flow from the second voltage rail to a reference potential node through the first capacitive element. At block 704, the SMPS generates an output voltage at an output node (e.g., output node 390) during a first charge phase by directing a second current (e.g., shown by curves 620, 622, 624) to flow from the first voltage rail to an inductive element of the SMPS through the first capacitive element. In some aspects, the first current and the second current are directed to flow when a voltage at the output node is greater than the voltage at the second voltage rail.

In some aspects, the first current is directed to flow through a first switch (e.g., switch 308) of the SMPS coupled between the second voltage rail and the first capacitive element, through the first capacitive element, and through a second switch (e.g., switch 304) of the SMPS coupled between the first capacitive element and the reference potential node. In this case, the second current may be directed to flow through a third switch (e.g., switch 302) of the SMPS coupled between the first voltage rail and the first capacitive element, the first capacitive element, and a fourth switch (e.g., switch 318) coupled between the first capacitive element and the inductive element.

In some aspects, the operations 700 further include directing, during a second charge phase, a third current (e.g., shown by curve 522) to flow from the second voltage rail to the inductive element through the first switch, and directing, during a second discharge phase, a fourth current (e.g., shown by curve 520) to flow from the first voltage rail to the inductive element through a fifth switch (e.g., switch 310 or 318) of the SMPS coupled between the first voltage rail and the inductive element. In some cases, the third and fourth currents may be directed to flow when the voltage at the output node is less than the voltage at the second voltage rail (and in some cases greater than the voltage at the first voltage rail).

In some aspects, the operations 700 further include directing, during a second charge phase, a third current (e.g., shown by curve 402) to flow from the first voltage rail to the inductive element through a fifth switch (e.g., switch 310 or switch 318) of the SMPS coupled between the first voltage rail and the inductive element, and directing, during a second discharge phase, a fourth current (e.g., shown by curve 404) to flow from the reference potential node to the inductive element through a sixth switch (e.g., switch 320) of the SMPS coupled between the reference potential node and the inductive element. In some cases, the third and fourth currents may be directed to flow when the voltage at the output node is less than the voltage at the first voltage rail.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering. For example, means for charging, means for directing, and means for generating may include one or more switches, such as the switches 302, 304, 308, 314, 306, 310, 318, 320.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC with the processor, the bus interface, the user interface in the case of an access terminal), supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

Example Aspects

In addition to the various aspects described above, specific combinations of aspects are within the scope of the disclosure, some of which are detailed below:

Aspect 1: A switched-mode power supply (SMPS) comprising: an inductive element coupled to an output of the SMPS; a first switch; a second switch, wherein the first switch is coupled between a first voltage rail and the second switch, and wherein the second switch is coupled between the first switch and the inductive element; a third switch coupled between the inductive element and a reference potential node; a fourth switch; a fifth switch, wherein the fourth switch is coupled between a second voltage rail and the fifth switch, and wherein the fifth switch is coupled between the fourth switch and the second switch; and a sixth switch coupled between the fifth switch and the reference potential node.

Aspect 2: The SMPS of Aspect 1, further comprising a capacitive element, wherein the fifth switch is coupled between the fourth switch and the second switch through the capacitive element.

Aspect 3: The SMPS of Aspect 1 or 2, further comprising: a seventh switch; an eighth switch, wherein the seventh switch is coupled between the first voltage rail and the eighth switch, and wherein the eighth switch is coupled between the seventh switch and the reference potential node; and a first capacitive element coupled between the seventh switch and the fifth switch.

Aspect 4: The SMPS of Aspect 3, wherein: a first current is configured to flow from the second voltage rail to the reference potential node through the fourth switch, the first capacitive element, and the eighth switch during a discharge phase; and a second current is configured to flow from the first voltage rail to the inductive element through the seventh switch, the first capacitive element, the fifth switch, and the second switch during a charge phase.

Aspect 5: The SMPS of Aspect 4, wherein a third current is configured to flow from the second voltage rail to the inductive element through the fourth switch, the fifth switch, and the second switch during the discharge phase.

Aspect 6: The SMPS of Aspect 4, further comprising a second capacitive element, the fifth switch being coupled between the fourth switch and the second switch through the second capacitive element, wherein: a third current is configured to flow from the first voltage rail to the reference potential node through the first switch, the second capacitive element, and the sixth switch during the discharge phase; and the second current is further configured to flow to the inductive element through the second capacitive element.

Aspect 7: The SMPS of any of the preceding Aspects, wherein the first voltage rail is shorted to the second voltage rail.

Aspect 8: The SMPS of any of the preceding Aspects, wherein: a first current is configured to flow from the first voltage rail to the inductive element through the first switch and the second switch during a charge phase; and a second current is configured to flow from the reference potential node to the inductive element through the third switch during a discharge phase.

Aspect 9: The SMPS of any of the preceding Aspects, wherein: a first current is configured to flow from the first voltage rail to the inductive element through the first switch and the second switch during a discharge phase; and a second current is configured to flow from the second voltage rail to the inductive element through the fourth switch, the fifth switch, and the second switch during a charge phase.

Aspect 10: The SMPS of Aspect 9, further comprising a capacitive element, the fifth switch being coupled between the fourth switch and the second switch through the capacitive element, wherein: a third current is configured to flow from the first voltage rail to the reference potential node through the first switch, the capacitive element, and the sixth switch during the discharge phase; and the second current is configured to flow from the second voltage rail to the inductive element through the capacitive element during the charge phase.

Aspect 11: An apparatus comprising the SMPS of any of the preceding Aspects, the apparatus further comprising: a first battery coupled between the first voltage rail and the reference potential node; and a second battery coupled between the second voltage rail and the first battery.

Aspect 12: A method for voltage regulation by a switched-mode power supply (SMPS), comprising: charging a first capacitive element during a first discharge phase of the SMPS, the SMPS having a first voltage rail and a second voltage rail, wherein the first voltage rail is separate from the second voltage rail, wherein a voltage at the first voltage rail is less than a voltage at the second voltage rail, and wherein charging the first capacitive element comprises directing a first current to flow from the second voltage rail to a reference potential node through the first capacitive element; and generating an output voltage at an output node during a first charge phase by directing a second current to flow from the first voltage rail to an inductive element of the SMPS through the first capacitive element.

Aspect 13: The method of Aspect 12, wherein: directing the first current comprises directing the first current to flow through a first switch of the SMPS coupled between the second voltage rail and the first capacitive element, through the first capacitive element, and through a second switch of the SMPS coupled between the first capacitive element and the reference potential node; and directing the second current comprises directing the second current to flow through a third switch of the SMPS coupled between the first voltage rail and the first capacitive element, the first capacitive element, and a fourth switch coupled between the first capacitive element and the inductive element.

Aspect 14: The method of Aspect 13, further comprising: directing, during a second charge phase, a third current to flow from the second voltage rail to the inductive element through the first switch; and directing, during a second discharge phase, a fourth current to flow from the first voltage rail to the inductive element through a fifth switch of the SMPS coupled between the first voltage rail and the inductive element.

Aspect 15: The method of Aspect 13, further comprising: directing, during a second charge phase, a third current to flow from the first voltage rail to the inductive element through a fifth switch of the SMPS coupled between the first voltage rail and the inductive element; and directing, during a second discharge phase, a fourth current to flow from the reference potential node to the inductive element through a sixth switch of the SMPS coupled between the reference potential node and the inductive element.

Aspect 16: The method of any of Aspects 13-15, wherein a first battery is coupled between the first voltage rail and the reference potential node and wherein a second battery is coupled between the second voltage rail and the first battery.

Aspect 17: An apparatus for voltage regulation, comprising: an inductive element; a capacitive element; a first voltage rail; a second voltage rail separate from the first voltage rail, wherein a voltage at the first voltage rail is configured to be less than a voltage at the second voltage rail; means for charging the capacitive element during a discharge phase of the apparatus, wherein the means for charging the capacitive element comprises means for directing a first current to flow from the second voltage rail to a reference potential node through the capacitive element; and means for generating an output voltage at an output node during a charge phase, wherein the means for generating comprises means for directing a second current to flow from the first voltage rail to the inductive element through the capacitive element.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A switched-mode power supply (SMPS) comprising:
   an inductive element coupled to an output of the SMPS;
   a first switch;
   a second switch, wherein the first switch is coupled between a first voltage rail and the second switch, and wherein the second switch is coupled between the first switch and the inductive element;
   a third switch coupled between the inductive element and a reference potential node;
   a fourth switch;
   a fifth switch, wherein the fourth switch is coupled between a second voltage rail and the fifth switch, and wherein the fifth switch is coupled between the fourth switch and the second switch;
   a sixth switch coupled between the fifth switch and the reference potential node, wherein a signal path is coupled between a first node of the SMPS and a second node of the SMPS, wherein the first node is coupled to a terminal of the first switch and a terminal of the second switch, and wherein the second node is coupled to a terminal of the fifth switch and a terminal of the sixth switch;

a seventh switch;

an eighth switch, wherein the seventh switch is coupled between the first voltage rail and the eighth switch, and wherein the eighth switch is coupled between the seventh switch and the reference potential node; and a first capacitive element coupled between the seventh switch and the fifth switch, wherein a first current is configured to flow from the second voltage rail to the reference potential node through the fourth switch, the first capacitive element, and the eighth switch during a discharge phase, and a second current is configured to flow from the first voltage rail to the inductive element through the seventh switch, the first capacitive element, the fifth switch, and the second switch during a charge phase.

2. The SMPS of claim 1, wherein a third current is configured to flow from the second voltage rail to the inductive element through the fourth switch, the fifth switch, and the second switch during the discharge phase.

3. The SMPS of claim 1, wherein:

the signal path comprises a second capacitive element, the fifth switch being coupled between the fourth switch and the second switch through the second capacitive element;

a third current is configured to flow from the first voltage rail to the reference potential node through the first switch, the second capacitive element, and the sixth switch during the discharge phase; and the second current is further configured to flow to the inductive element through the second capacitive element.

4. The SMPS of claim 1, wherein the first voltage rail is shorted to the second voltage rail.

5. An apparatus comprising the SMPS of claim 1, the apparatus further comprising:

a first battery coupled between the first voltage rail and the reference potential node; and a second battery coupled between the second voltage rail and the first battery.

6. A method for voltage regulation by a switched-mode power supply (SMPS), comprising:

charging a first capacitive element during a first discharge phase of the SMPS, the SMPS having a first voltage rail and a second voltage rail, wherein the first voltage rail is separate from the second voltage rail, wherein a voltage at the first voltage rail is less than a voltage at the second voltage rail, and wherein charging the first capacitive element comprises directing a first current to flow from the second voltage rail to a reference potential node through the first capacitive element; and generating an output voltage at an output node during a first charge phase by directing a second current to flow from the first voltage rail to an inductive element of the SMPS through the first capacitive element.

7. The method of claim 6, wherein:

directing the first current comprises directing the first current to flow through a first switch of the SMPS coupled between the second voltage rail and the first capacitive element, through the first capacitive element, and through a second switch of the SMPS coupled between the first capacitive element and the reference potential node; and directing the second current comprises directing the second current to flow through a third switch of the SMPS coupled between the first voltage rail and the first capacitive element, the first capacitive element, and a fourth switch coupled between the first capacitive element and the inductive element.

8. The method of claim 7, further comprising:

directing, during a second charge phase, a third current to flow from the second voltage rail to the inductive element through the first switch; and directing, during a second discharge phase, a fourth current to flow from the first voltage rail to the inductive element through a fifth switch of the SMPS coupled between the first voltage rail and the inductive element.

9. The method of claim 7, further comprising:

directing, during a second charge phase, a third current to flow from the first voltage rail to the inductive element through a fifth switch of the SMPS coupled between the first voltage rail and the inductive element; and directing, during a second discharge phase, a fourth current to flow from the reference potential node to the inductive element through a sixth switch of the SMPS coupled between the reference potential node and the inductive element.

10. The method of claim 7 wherein a first battery is coupled between the first voltage rail and the reference potential node and wherein a second battery is coupled between the second voltage rail and the first battery.

11. An apparatus for voltage regulation, comprising:

an inductive element;

a capacitive element;

a first voltage rail;

a second voltage rail separate from the first voltage rail, wherein a voltage at the first voltage rail is configured to be less than a voltage at the second voltage rail;

means for charging the capacitive element during a discharge phase of the apparatus, wherein the means for charging the capacitive element comprises means for directing a first current to flow from the second voltage rail to a reference potential node through the capacitive element; and means for generating an output voltage at an output node during a charge phase, wherein the means for generating comprises means for directing a second current to flow from the first voltage rail to the inductive element through the capacitive element.

12. The SMPS of claim 1, wherein the first voltage rail is separate from the second voltage rail.

* * * * *